Dec. 16, 1969  F. ARNOLD  3,484,094
CLAMPING DEVICE HAVING AN OPERATING SCREW PORTION
Filed March 30, 1967  2 Sheets-Sheet 1
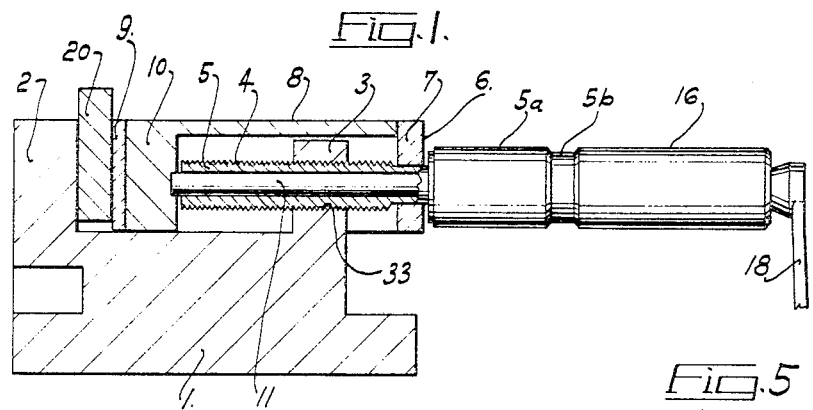
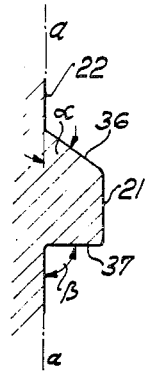
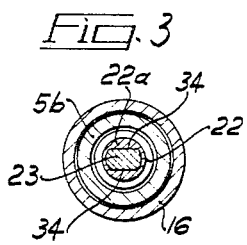 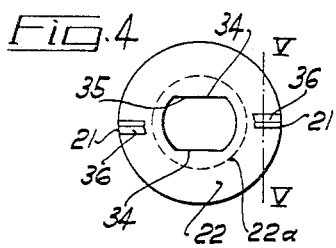
*INVENTOR.*
*FRANZ ARNOLD*
BY
*ATTORNEYS*

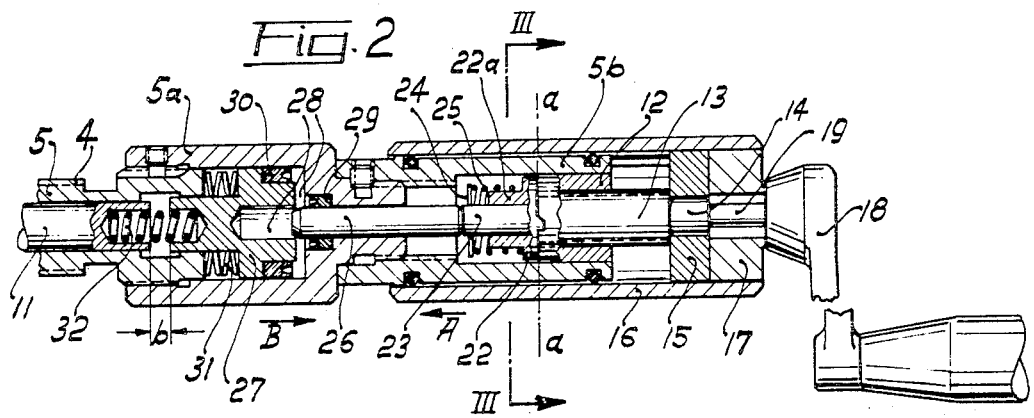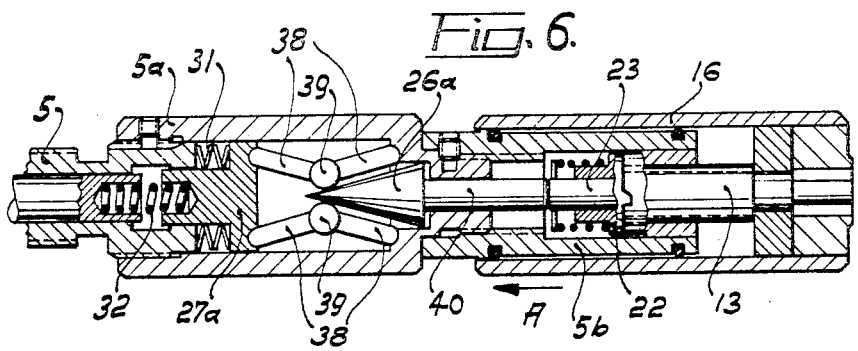

United States Patent Office 3,484,094
Patented Dec. 16, 1969

3,484,094
CLAMPING DEVICE HAVING AN OPERATING
SCREW PORTION
Franz Arnold, Spatzenweg 48, Kempten, Allgau, Germany
Filed Mar. 30, 1967, Ser. No. 627,019
Claims priority, application Germany, Feb. 9, 1967,
A 54,848
Int. Cl. B23q 3/08
U.S. Cl. 269—24          6 Claims

ABSTRACT OF THE DISCLOSURE

A clamping device having a hollow spindle threadably engaged in a stationary screw portion further having a drive spindle threadably engageable therein, said drive spindle and said hollow spindle being additionally interconnected by means of a torque transmitting clutch. The drive spindle is interconnected to a pressure applying rod by means of a force multiplier means, said force multiplier including primary and secondary pressure members with said second pressure member being spaced from the pressure rod and with a pressure spring interconnected therebetween. The pressure spring is compressed during initial clamping of the work piece by threadably engaging the hollow spindle within the stationary screw portion whereby the secondary pressure member and the pressure rod bear against each other, which operation also causes the clutch to disengage so as to apply force directly to the pressure rod. Upon release of the clamp device, said pressure spring imposes a friction torque on the hollow spindle thread so as to maintain the spindle stationary, said friction torque holding the spindle being greater than the friction torque of the disengaged clutch whereby reverse rotation of the drive spindle causes the clutch to first re-engage before any rotational movement is imposed on the hollow spindle.

BACKGROUND OF THE INVENTION

The invention relates to a workpiece clamping device incorporating therein a force multiplier and having an operating screw portion. The clamping device comprises a hollow spindle threadably engaged in a stationary screw portion, a pressure rod axially movable within said hollow spindle, a drive spindle threadably engageable with an extension of said hollow spindle, a torque transmitting clutch interconnected between the drive spindle and hollow spindle, and a force multiplier arranged between the drive spindle and the pressure rod, said force multiplier having a primary member which is axially movable by the drive spindle and a secondary pressure member which is axially movable and acts on the pressure rod.

It can happen in the case of a clamping device of this construction that upon releasing of the workpiece, namely upon turning back of the drive spindle, the drive spindle is turned back immediately due to the friction torque produced by the disengaged clutch so that the torque transmitting clutch does not re-engage. This is disadvantageous since, during the next clamping operation, only a small clamping force can be developed so as to act on the workpiece. To overcome said disadvantage, the clamping device or operating screw portion thereof of the present invention has an axially acting pressure spring arranged between a pressure rod and a secondary pressure member in such a way that a space is provided between the pressure rod and the secondary member in the unloaded or unclamped condition. Upon initial clamping of the workpiece, a hollow spindle is threadably engaged within a fixed support whereby the pressure spring is compressed so that secondary member and the pressure rod bear against each other. When the clamp is initially released, namely upon turning back of the drive spindle, a friction torque is produced by said spring in the hollow spindle thread, said friction torque holding said spindle and being greater than the friction torque of the disengaged clutch on the hollow spindle.

This arrangement of the invention guarantees that upon releasing of the workpiece, namely upon turning back the drive spindle, the hollow spindle is held initially stationary until the torque transmitting clutch re-engages, with the hollow spindle being turned back or released only after a further turning back of the drive spindle. The operating processes occurring in the clamping device during clamping are repeated in exactly the reverse order during releasing.

BRIEF DESCRIPTION OF THE DRAWINGS

The invention will be further described in detail and reference will be had to the drawings wherein:

FIGURE 1 is a fragmentary longitudinal sectional view of an operating screw portion with a force multiplier schematically illustrated, FIGURE 2 is an enlarged central cross-sectional view of a portion of said operating screw, FIGURE 3 is a cross-sectional view along the line III—III of FIGURE 2, FIGURE 4 is a side-elevational view of a clutch disk of FIGURE 2, FIGURE 5 is an enlarged fragmentary sectional view of a clutch tooth taken along the line V—V of FIGURE 4, FIGURE 6 is a central cross-sectional view of a modified operating screw portion of the type illustrated in FIGURE 2.

DETAILED DESCRIPTION OF THE INVENTION

The base plate of the operating screw portion is illustrated at 1 in the drawings, said base plate having a stationary jaw 2 and a bearing 3 wherein a hollow spindle 5 being provided with an external thread 4 thereon is threadably engaged. Said hollow spindle has a neck 6 mounted in the rearward portion 7 of the slide member 8, the front portion 10 of which has a pressure rod 11 supported thereon, said rod being arranged to be axially movable in the hollow spindle 5. Said front portion 10 has a movable jaw 9. As illustrated in detail in FIGURE 2, the hollow spindle 5 has extensions 5a, 5b which form a rigid unit together with said hollow spindle. A sleeve 12 which is also constructed as a clutch member is fixedly connected to the extension 5b, said sleeve having a drive spindle 13 threadably received therein. The end portion 14 of said spindle is affixed to a head 15 which in turn is affixed to a sleeve 16 and a disk 17. Moreover, a hand crank 18 is provided which can be inserted into a polygonal opening of the disk 17 by means of a polygonal projection 19. To clamp the workpiece 20, said crank 18 rotated in a clockwise direction (as viewed from the rightward end of FIGURE 2) and to release said workpiece said crank is rotated in a counterclockwise direction.

A torque transmitting clutch is connected between the hollow spindle 5, 5a, 5b and the drive spindle 13. A stop clutch is provided in the illustrated embodiment for this purpose, said clutch comprising a clutch disk 22 having teeth 21 and a clutch sleeve 12 being provided with recesses corresponding to the teeth 21. A disk 24 is connected to the extension 23 of the drive spindle 13. A pressure spring 25 is arranged between said disk and the clutch disk 22, said spring holding the clutch parts 22, 12 in engagement during the beginning of the clamping process whereby initial rotation of the drive spindle 13 also rotates the hollow spindle 5, 5a, 5b so as to cause the spindle 5 to be screwed into the internal thread of the bearing 3. The slide member 8 is thus, by means of the movement of the pressure rod 11 along with the spindle 5, guided to the workpiece 20 and a small initial pressure, for example 100 kg., is applied onto said workpiece. Upon further rotation of the drive spindle 13, the clutch disk 22 is disengaged due to increased rotational resistance of spindle 5 whereby the clutch disk 22 is moved axially in direction A so that the hollow spindle 5, 5a, 5b is disengaged and stopped, the drive spindle 13 upon further rotation being further threadably engaged with the now stationary sleeve 12 in the axial direction A. The end portions of the spindle 23 applies a very high moving force (for example 8 tons) onto the pressure rod 11 in direction A through an intermediate force multiplier said end portion of the spindle 23 being then used to clamp the workpiece 20.

The force multiplier arranged between the drive spindle 23, 13 and the pressure rod 11 has a primary pressure member 26 and a secondary pressure member 27 acting on the pressure rod. In the embodiment of FIGURE 2, which illustrates a mechanical hydraulic clamping device, the primary pressure member 26 consists of a rod-like piston and the secondary pressure member 27 consists of a hydraulic secondary piston having a considerably greater diameter where a force multiplication is created. The spindle extension 5a is accordingly constructed as a hydraulic cylinder having a cylinder chamber 28 therein which is filled with a hydraulic pressure fluid. Sealing rings 29, 30 are provided for the primary and secondary pistons. Furthermore, a spring means preferably in form of a disk spring 31 is provided, said spring means being adapted to continuously urge the secondary piston 27 in axial direction B.

According to the invention, a spring means preferably a helical spring 32 is positioned between the pressure rod 11 and the secondary pressure member 27 so that a space b (compare FIGURE 2) is provided between the pressure rod 11 and the secondary member 27 in the unclamped condition. During the initial clamping of the workpiece during which the spindles 5 and 13 are rotated, the pressure rod 11 is moved relative to spindle 5 in axial direction B due to the resistance of the workpiece 20. Consequently, the spring 32 is compressed until the space b is decreased to zero and the secondary pressure member 27 and the pressure rod 11 bear against one another. Due to the increased resistance of the workpiece 20 acting onto the pressure rod 11, the hollow spindle 5, 5a, 5b stops whereby the clutch disk 22 disengages. Upon further rotation of the drive spindle 13 within the sleeve 12, the primary piston 26 is moved axially in direction A, said primary piston applying a hydraulic pressure by means of chamber 28 onto the secondary piston 27 and moving same also in direction A so that a high clamping pressure is applied to workpiece 20 by the pressure rod 11.

When the workpiece is released, namely, when the drive spindle 13 is rotated in the opposite direction, spring 32 exerts a pressure on the secondary piston 27 in direction B which in turn exerts on the hollow spindle 5a, 5. Spring 32 also exerts a pressure against the pressure rod 11 which is transmitted to the workpiece 20. By this pressure, a friction torque is obtained between the external thread 4 and the internal thread 33 of the bearing 3, said friction torque holding the spindle 5 and preventing same from rotating. The pressure spring 32 and the clutch spring 25 must be balanced in such a way that the aforementioned friction torque produced between the threads 4, 33 is greater than the friction torque of the disengaged clutch 22, 12 acting on the hollow spring 5a–5b. Said latter friction torque is produced by the pressure of the clutch spring 25, said pressure being used to press the clutch teeth 21 against the face of the clutch sleeve.

The hollow spindle 5 is held stationary at the beginning of the releasing movement (the initial turning back of the drive spindle 13) because of the pressure spring 32, the spindle 5 remaining stationary until the clutch teeth 21 engage in the corresponding recesses of the clutch sleeve 12. Thus, the drive spindle 13 is again connected to the hollow spindle 5 through said clutch so that upon further turning back or rotation of the drive spindle 13, the hollow spindle 5 is also rotatably turned back in the bearing 3 whereby it is moved axially in direction B.

The clutch disk 22, mounted on the extension 23 of the drive spindle 13, is arranged to be axially movable but is secured against rotation relative thereto. The spindle extension 23 can be flattened at 34 for this purpose, as is illustrated in FIGURES 3 and 4, with the clutch disk 22 having a corresponding recess 35 therein.

The torque transmitting clutch is, as illustrated, advantageously constructed as a stop clutch. Suitable clutch teeth 21 and corresponding recesses are provided which have on one flank an inclined surface 36 allowing disengagement of the clutch and on the other oppositely positioned flank a surface 37 being perpendicular to the plane of the clutch disk, namely having an angle of 90°. Relatively weak helical springs can be advantageously used for both springs 32 and 25. The surface 36 of the teeth (or recesses) is inclined at a relatively large angle of approximately 50° with respect to the plane of the clutch disk a—a. To guarantee an easy disengagement at a predetermined torque, or to prevent a tilting of the clutch disk on the end portion of the spindle 23, the clutch disk 22 is provided with a long sleeve 22a for better guiding thereof.

This invention is not limited to the illustrated embodiment. For example, instead of using the above-described hydraulic force multiplier, a mechanical force multiplier as illustrated in FIGURE 6 may be provided. In such an embodiment, the secondary member 27a is connected to a toggle system 38, 39 whereby a roller is preferably provided at each joint 39. A V-shaped wedge or cone 26a cooperates with said rollers, said wedge being attached to a pressure bolt 40. Said V-shaped wedge 26a acting as a primary member, spreads apart both legs 38, 39 when moving in direction A so that the secondary member 27a actuated by the toggle transmission is also moved in direction A.

The embodiments of the invention in which an exclusive property or privilege is claimed are defined as follows:

1. A clamping device, comprising:
a fixed jaw and a movable jaw;
support means fixed with respect to said fixed jaw on the opposite side of said movable jaw from said fixed jaw and having a threaded opening therethrough;
a threaded spindle having an axial opening therethrough and threaded through said threaded opening for movement toward and away from said fixed jaw on rotation thereof, said threaded spindle having an enlarged and hollow end portion on the opposite side of said support means from said movable jaw, said enlarged head portion having a threaded opening adjacent the end remote from said threaded spindle;
a pressure rod extending axially slideably through the opening in said threaded spindle and being directly directly engageable with said movable jaw for urging same toward said fixed jaw, said pressure rod extending into one end of said enlarged and hollow end portion;
a threaded drive rod threaded through said threaded opening in said enlarged end portion of said threaded spindle for movement toward and away from said pressure rod on rotation of said drive rod;
a torque transmitting clutch interconnecting said drive rod and said threaded spindle and arranged to be disconnectible;
force multiplier means positioned between said drive rod and said pressure rod, said force multiplier means comprising a primary pressure member engaging said drive rod and driven axially thereby and an axially movable secondary pressure member, a resilient spring member located between said pressure rod and said secondary pressure member to resiliently urge said pressure rod and said secondary pressure member away from each other so that a space exists therebetween when in the unloaded condition and, when initially loaded, said spring member resiliently urging said pressure rod into engagement with said movable jaw to apply an initial low pressure on said movable jaw to clamp a workpiece located between said movable jaw and said fixed jaw, said torque transmitting clutch effectively disengaging the connection between said drive rod and said threaded spindle after said initial loading and a further rotation of said drive rod whereupon said drive rod will move axially toward said primary and secondary pressure members, which multiply the force applied by the drive rod to said pressure rod, to effectively clamp said workpiece between said movable jaw and said fixed jaw.

2. A clamping device according to claim 1, wherein tongue means and groove means are provided on an interface between the clutch elements of the torque transmitting clutch, said tongue means having on one flank an inclined surface which makes possible the disengagement of the clutch and having on the other opposed flank a surface perpendicularly positioned with respect to the plane of the clutch interface.

3. A clamping device according to claim 2, wherein the inclined surface is inclined at an angle of approximately 50° with respect to the plane of the clutch interface.

4. A clamping device according to claim 1, wherein one clutch element of said torque transmitting clutch is arranged on the drive rod, said one clutch element being movable axially relative to said drive rod but being secured again relative rotation with respect thereto, said one clutch element having spring-loaded engaging means thereon and a long sleeve for guiding same for axial movement relative to said drive rod.

5. A clamping device according to claim 1, wherein said primary pressure member consists of a small diameter primary piston and said secondary pressure member consists of a secondary piston having a considerably larger diameter relative to said primary pressure member.

6. A clamping device according to claim 1, wherein said force multiplier means comprises mechanically expansible members and a tapered head arranged between said drive rod and said threaded spindle, said tapered head being secured and movable with said primary pressure member, whereby an axial movement of said tapered head will effect an expansion of said mechanically expansible means to urge said pressure rod axially of said threaded spindle.

References Cited
UNITED STATES PATENTS

| 2,803,157 | 8/1957 | Seitter | 269—32 X |
| 3,095,190 | 6/1963 | Freund | 269—32 X |
| 3,147,002 | 9/1964 | Arnold | 269—24 |

ROBERT C. RIORDON, Primary Examiner

D. R. MELTON, Assistant Examiner

U.S. Cl. X.R.

269—32